(12) United States Patent
Markham

(10) Patent No.: US 12,171,193 B2
(45) Date of Patent: Dec. 24, 2024

(54) SYSTEM, METHOD, AND DEVICE FOR SECURING A LEASH TO AN OBJECT

(71) Applicant: William Markham, Alpine, UT (US)

(72) Inventor: William Markham, Alpine, UT (US)

( * ) Notice: Subject to any disclaimer, the term of this patent is extended or adjusted under 35 U.S.C. 154(b) by 41 days.

(21) Appl. No.: 18/067,658

(22) Filed: Dec. 16, 2022

(65) Prior Publication Data

US 2023/0225292 A1 Jul. 20, 2023

Related U.S. Application Data

(60) Provisional application No. 63/290,515, filed on Dec. 16, 2021.

(51) Int. Cl.
  *A01K 27/00* (2006.01)

(52) U.S. Cl.
  CPC .......... *A01K 27/005* (2013.01); *A01K 27/003* (2013.01)

(58) Field of Classification Search
  CPC ..... A01K 27/005; A01K 27/003; A01K 27/00
  See application file for complete search history.

(56) References Cited

U.S. PATENT DOCUMENTS

| | | | | |
|---|---|---|---|---|
| 3,898,951 A | * | 8/1975 | Clare .................. | B42D 3/14 116/239 |
| 5,839,394 A | * | 11/1998 | Dickison .............. | A01K 27/005 119/795 |
| 5,913,479 A | * | 6/1999 | Westwood, III ...... | F16B 45/036 24/600.9 |
| 7,343,647 B1 | * | 3/2008 | Kinskey ................... | A45F 5/00 224/268 |
| 9,255,602 B2 | * | 2/2016 | Liang .................... | F16B 45/036 |
| 9,848,584 B1 | * | 12/2017 | Alden .................. | A01K 27/005 |
| D854,916 S | * | 7/2019 | Derr ............................ | D8/356 |
| 10,584,736 B2 | * | 3/2020 | Ormsbee ................. | F16B 45/02 |
| 11,300,247 B1 | * | 4/2022 | Miles ................... | F16M 13/027 |
| 11,920,627 B2 | * | 3/2024 | Adelman .............. | F16B 45/027 |
| 2004/0172735 A1 | * | 9/2004 | Garland ............. | A41D 19/0041 2/160 |
| 2013/0017055 A1 | * | 1/2013 | Vieira ...................... | B25G 1/02 414/800 |
| 2017/0042124 A1 | * | 2/2017 | Cooper ................ | A01K 27/005 |
| 2019/0116762 A1 | * | 4/2019 | Litzsinger ............ | A01K 27/005 |

FOREIGN PATENT DOCUMENTS

FR 2504354 A2 * 10/1982

* cited by examiner

*Primary Examiner* — Kristen C Hayes
(74) *Attorney, Agent, or Firm* — TechLaw Ventures, PLLC; Terrence J. Edwards

(57) ABSTRACT

Systems, methods, and devices for securing an object using a connection device. The systems, methods, and devices for securing an object using a connection device, for example to hang a decoration from a ceiling rafter, attach a strap to a trailer, or any other situation in which a connection device is needed, including for an owner to restrain pets using a leash without actually holding on to the leash. A device and system may include a loop constructed of a flexible material, wherein the material comprises a hole disposed therethrough and a connector including a frame. A portion of the frame is disposed through the hole of the loop such that the connector is releasably coupled to the loop and the connector is configured to receive a line.

10 Claims, 13 Drawing Sheets

900

```
┌─────────────────────────────────────────────────────────┐
│ Forming A Loop Around A Loop Of A Leash Or Around A     │
│ Handle Of A Retractable Leash.                          │
│                         902                             │
└─────────────────────────────────────────────────────────┘
                             │
                             ▼
┌─────────────────────────────────────────────────────────┐
│           Wrapping A Leash Cord Around An Object.       │
│                         904                             │
└─────────────────────────────────────────────────────────┘
                             │
                             ▼
┌─────────────────────────────────────────────────────────┐
│ Attaching The Leash Cord To The Device By Hooking The   │
│ Leash Cord Into A Connector Attached To The Device.     │
│                         906                             │
└─────────────────────────────────────────────────────────┘
```

Attaching A Loop Of Flexible Material Around The Loop Or Handle Of A Leash. Permanently Joining The Ends Of The Flexible Material Such That There Is A Tap Or Length Of Flexible Material Extending From The Joined Loop.
1002

Forming A Hole Into The Tab And Attaching A Connector To The Hole In The Tab.
1004

Wrapping A Leash Cord Around An Object And Then Clipping The Leash Cord Into Connector To Attach The Leash To The Object.
1006

Attaching A Looped Flexible Material To An Object.
1102

Attaching A Looped Flexible Material To A Connector.
1104

Attaching A Leash Cord To The Connector Such That The Least Is Attached To The Object.
1106

Releasably Coupling A Loop To A First Ring Formation Of A Double Gate Connector. The Loop Is Constructed Of A Flexible Material, And The Flexible Material Includes A Hole Disposed Therethrough. The Hole Disposed Through The Flexible Material Is Sized For Receiving A First Gate And/or A Frame Of The Double Gate Connector.
1202

Looping A Leash Around A Post.
1204

Releasably Hooking A Second Ring Formation Of The Double Gate Connector Around The Leash To Releasably Secure The Leash To The Post. The Second Ring Formation Is Releasably Hooked By Opening A Second Gate Of The Double Gate Connector.
1206

FIG. 12

SYSTEM, METHOD, AND DEVICE FOR SECURING A LEASH TO AN OBJECT

TECHNICAL FIELD

The disclosure relates to systems, methods, and devices for releasably securing a line to an object, and specifically to releasing securing a leash to a post with a gated connector.

BACKGROUND

Pet owners often take their pets for walks. In many places, when walking a pet, laws require the pet remain on a leash. Even in places where leashes are not required by law, a pet owner may be liable for damage or injury caused by a pet not on a leash. For these reasons, it is wise to keep pets restrained when the pets are in public areas. Pet owners may use a variety of different leashes including traditional leashes and retractable leashes. Retractable leashes allow the owner to give the pet more or less room to roam depending on the circumstances. Retractable leashes typically include a leash handle in which a retractable cord is contained.

In many instances, however, it may become necessary (or it may be convenient) for the owner to leave the pet on a leash for a short time. Examples include, the pet owner needing to use a restroom, wanting to get a drink, or going into a store or other location where pets might not be allowed. Other examples include times that a pet owner may desire to leash a pet to a fixed object within sight of the owner while the owner engages in a recreational activity such as enjoying a picnic, participating in a sports activity, or swimming/sunbathing at the beach, or the like.

When an owner wants to restrain a leashed pet, they are faced with the problem of how to attach the leash to a fixed object without removing the leash from the pet's collar. Whether the leash is a standard leash, or a retractable leash they are not configured to be attached to other objects. While owners can tie or otherwise attach a leash to an object, this shortens the leash and restricts the movement of the pet. In many cases, after tying or otherwise attaching the leash to an object, the leash is too short to comfortably restrain the pet. Furthermore, leashes are not made to be tied to objects and the leash material could be abraded or otherwise damaged when the pet is tied to a fixed object.

In light of the foregoing, disclosed herein are systems, methods, and devices for attaching leashes to fixed objects without damaging the leash and without causing the leash to be too short for the pet to be comfortable while restrained.

BRIEF DESCRIPTION OF THE DRAWINGS

Non-limiting and non-exhaustive implementations of the disclosure are described with reference to the following figures, wherein like reference numerals refer to like or similar parts throughout the various views unless otherwise specified. Advantages of the disclosure will become better understood with regard to the following description and accompanying drawings where:

FIG. 9 is a schematic flow chart diagram of a method for using a device to secure a leash to an object;

FIG. 10 is a schematic flow chart diagram of a method for using a device to secure a leash to an object;

FIG. 11 is a schematic flow chart diagram of a method for using a device to secure a leash to an object: and FIG. 12 is a schematic flow chart diagram of a method for releasably securing a leash to a post.

DETAILED DESCRIPTION

Figure 1A:
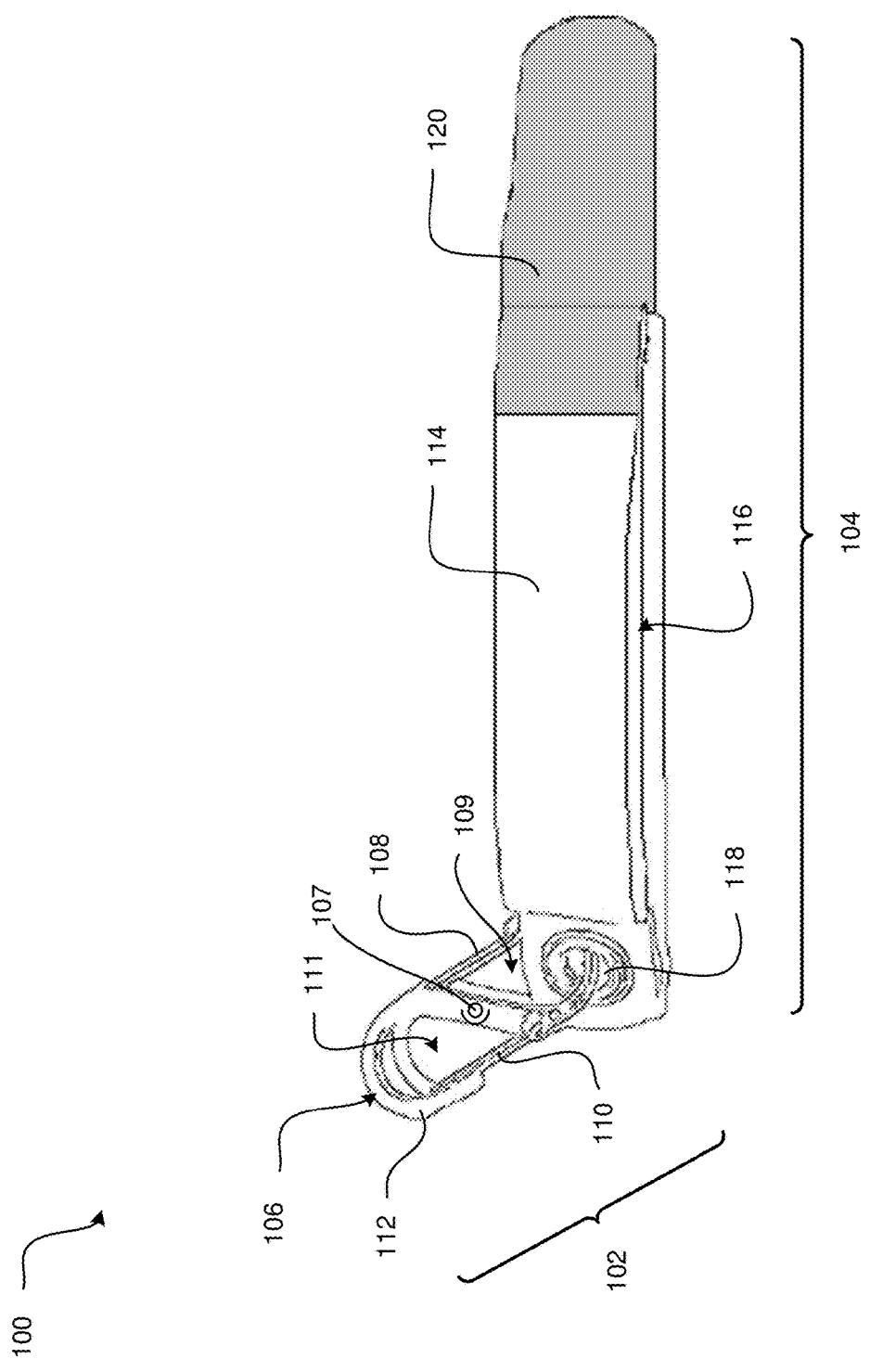
FIGS. 1a and 1b illustrate a front view of an exemplary device for securing a leash to an object.

Disclosed herein are systems, methods, and devices for releasably securing a line to an object. The systems, methods, and devices described herein may specifically implemented for releasably securing a leash to a post to restrain a pet without holding the leash. The devices described herein may be used in connection with regular or extendable leashes when an owner of a pet desires to attach the leash to an object.

One method of securing a pet to an object in a public area includes tying the pet's leash to the object. This method is problematic because the leash cord is not intended to be tied into a knot. Furthermore, the pet owner may not adequately secure the knot to the object, thus, allowing the pet to free itself, and get lost and/or cause damage and/or injury to itself or others. If the pet owner does tie a very secure knot, the pet pulling on the leash might cause the knot to tighten and be very difficult to untie. Finally, tying a very secure knot by unskilled person might require a substantial amount of the leash cord, leaving the pet little or no leash to move around and/or get comfortable.

Another method of securing a pet to an object includes removing the leash from the pet, wrapping the leash around an object, threading the leash through the leash handle (or loop), and then reattaching the leash to the pet. This method can also be problematic because the pet is not on the leash while the owner is securing it to an object. If there are two or more people, one person could hold the pet while the other wraps the leash around the object, but with only one person, the pet could get away. Furthermore, depending on the size of the object used, there could be very little leash left for the animal to use to move around or get comfortable.

In light of the foregoing, disclosed herein are embodiments of attachment devices configured to attach leashes to a variety of fixed or other objects. The embodiments described herein enable numerous benefits to pet owners who desire or need to attach the pet's leash to an object to restrain their pet or pets while the owner engages in another activity.

Before the methods, systems, and devices for allowing an owner to restrain pets with leashes without actually holding on to the leash are disclosed and described, it is to be understood that this disclosure is not limited to the configurations, process steps, and materials disclosed herein as such configurations, process steps, and materials may vary somewhat. It is also to be understood that the terminology employed herein, is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the term "about" used in reference to a given parameter is inclusive of the stated value and has the meaning dictated by the context (e.g., it includes the degree of error associated with measurement of the given parameter).

As used herein, the terms "comprising," "including," "containing," "characterized by," and grammatical equivalents thereof are inclusive or open-ended terms that do not exclude additional, unrecited elements or method steps.

As used herein, the term "ring formation" is inclusive of all geometries and is not limited to circular or elliptical geometries. The ring formations described herein form a closed loop, and in some cases, the closed loop may be opened with a gate or other means.

A detailed description of systems, methods, and devices consistent with embodiments of the disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for clarity, certain technical material that is known in the related art has not been described in detail to avoid unnecessarily obscuring the disclosure.

Figure 1B:
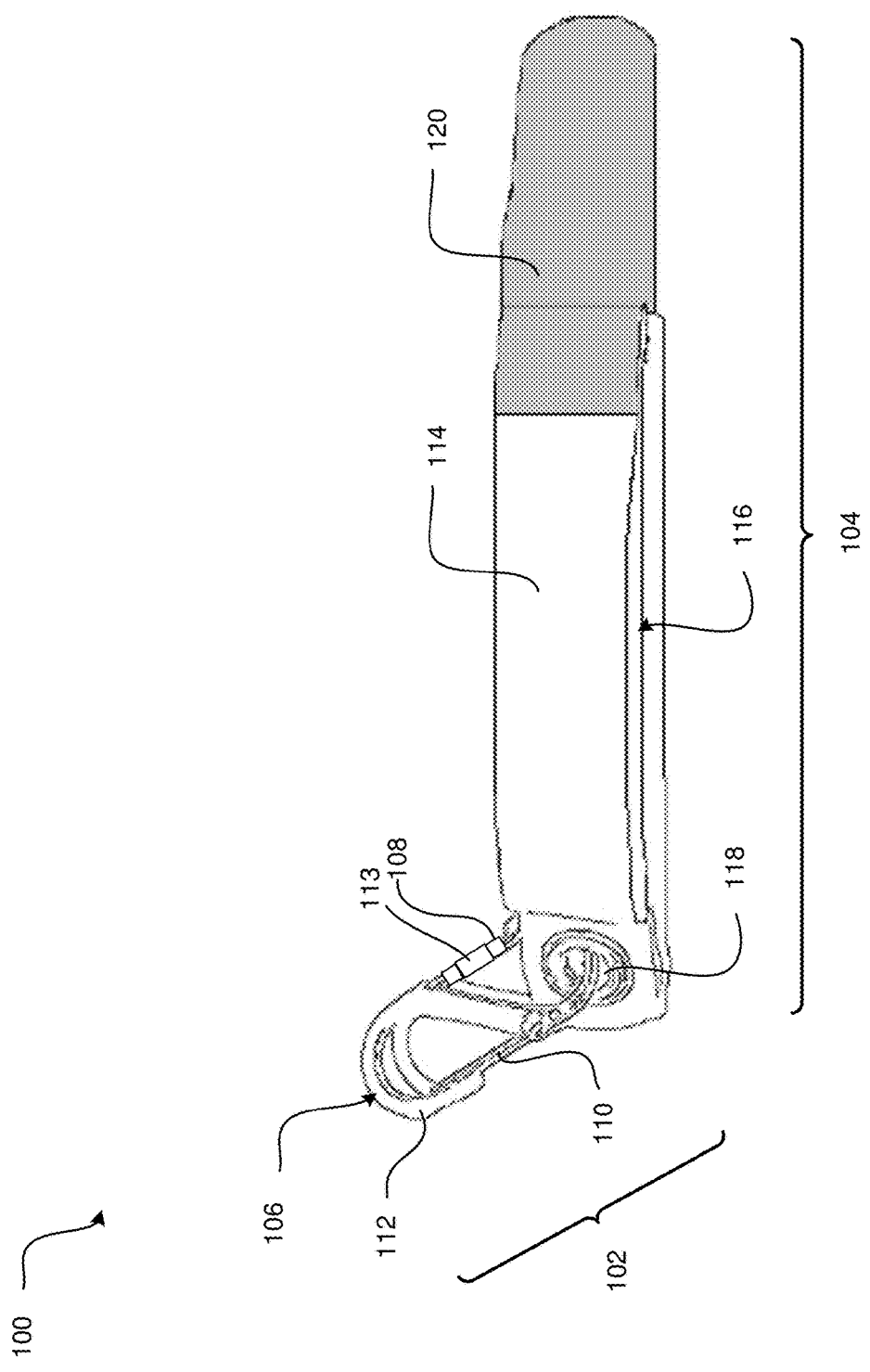

Referring now to the figures, FIGS. 1a and 1b illustrate a device 100 for releasably securing a line to an object. The device 100 may specifically be used for securing a leash to a post or similar object to restrain an animal without actively holding the leash. The device 100 includes a connector portion 102 and a loop portion 104 as shown in FIGS. 1a and 1b.

The connector portion 102 may be implemented with several different embodiments as described herein. In FIGS. 1a and 1b, the connector portion 102 includes a double gate connector 106 that comprises a first gate 108 and a second gate 110. The double gate connector 106 comprises a rigid frame 112 that forms two encircled ring formations (as described herein the "ring formations" defined by the double gate connector 106 need not have a circular geometry). The geometry of the frame 112 specifically defines a first ring formation 109 and a second ring formation 111. The first gate 108 serves as a component of the first ring formation 109, and the first gate 108 may be depressed to create an opening into the first ring formation 109. The second gate 110 serves as a component of the second ring formation 111, and the second gate 110 may be depressed to create an opening into the second ring formation 111.

The double gate connector 106 may be implemented with different features. In some implementations, one or more of the first gate 108 or the second gate 110 comprises a spring such that the gate 108, 110 automatically springs back to reform the ring formation 109, 111 when the gate 108, 110 is not actively being depressed by a user or another object. When each of the first gate 108 and the second gate 110 are implemented with a spring, the double gate connector 106 may be referred to as a double spring gate connector. In other implementations, only one of the first gate 108 or the second gate 110 may be implemented with a spring. In an implementation, and illustrated best in FIG. 1a, the connector 106 comprises a swivel 107 disposed between the first gate 108 and the second gate 110, such that the swivel enables the first gate 108 to rotate relative to the second gate 110.

In other implementations, and as illustrated in FIG. 1b, one or more of the first gate 108 or the second gate 110 is implemented with a locking sleeve 113, such as a locking sleeve implemented with a locking carabiner. In this implementation, the gate 108, 110 may include a rivet pin enabling the gate 108, 110 to pivot inward toward the center of the ring formation 109, 111. When the gate 108, 110 is released and no longer pressed inward, the gate 108, 110 may be locked to a nose formation of the frame and then locked in place with a locking sleeve 113.

The connector portion 102 may include a dual carabiner as shown in FIGS. 1a and 1b, and may alternatively include another connection means that defines a first ring formation 109 and a second ring formation 111. The two ring formations 109, 111 defined by the connector portion 102 allow the connector portion 102 to be releasably coupled to the loop portion 104.

The connector portion 102 may be formed as a component of a retractable leash or a standard leash. The connector portion 102 may be releasably attached to a retractable leash or a standard leash. Thus, the connector portion 102 provides convenience and adaptability for a user to interface with different leash devices.

The loop portion 104 of the device 100 includes a length of flexible material 114. The flexible material 114 is releasably or permanently disposed in a loop formation to define a loop 116. The flexible material 114 includes a hole 118 disposed therethrough, and the hole 118 may include a reinforcement grommet as shown in FIGS. 1a and 1b. The loop portion 104 may additionally include a tab 120 wherein the flexible material 114 is not disposed in a loop formation, but rather forms a flat tab that may be easily gripped by a user.

Figure 2:
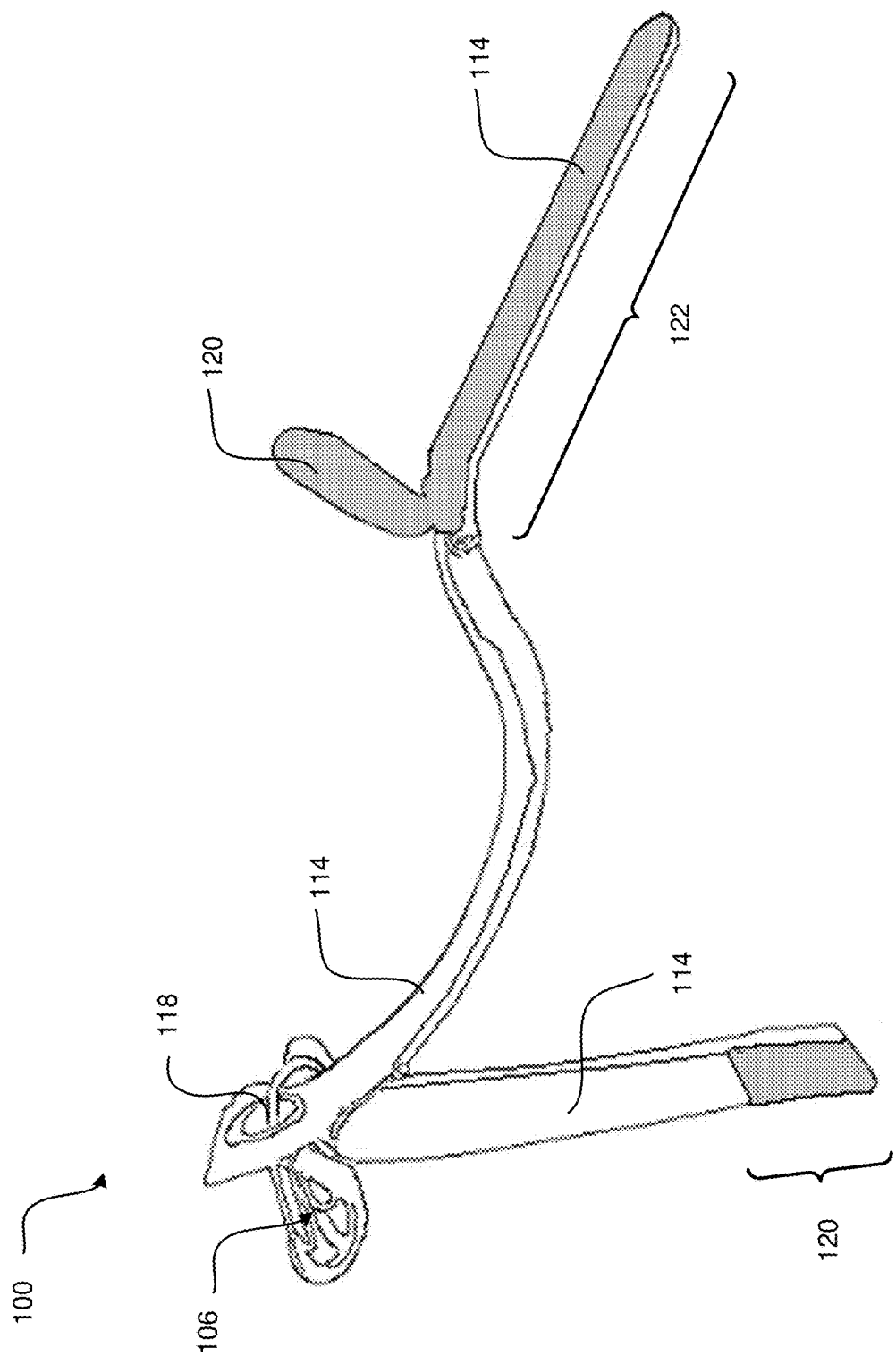
FIG. 2 is a side view of a fully expanded exemplary device for securing a leash to an object.

FIG. 2 is an exploded view of the device 100, wherein the flexible material 114 is opened and not formed into the loop 116 formation shown in FIGS. 1a and 1b. The flexible material 114 includes a first releasably attachable end 120 and a second releasably attachable end 122. The releasably attachable ends 120, 122 enable a user to create and break the loop 116 formation, and further to adjust the size of the loop 116 formation.

The first releasably attachable end 120 and the second releasably attachable end 122 include a means for attaching a first end of the flexible material 114 to a second end of the flexible material 114. The example illustrated in FIG. 2, the releasably attachable ends 120, 122 are configured to attach to one another with a hook and loop material. The releasably attachable ends 120, 122 may be connected by other means, including, for example, snaps, buckles, click buckles, hooks, zippers, buttons, clasps, hook and eye closure, and so forth.

In an exemplary embodiment, the overall length of device 100 is about 135 mm. When the second releasably attachable end 122 is folded over and attached to first releasably attachable end 120, the overall length of the device 100 may be about 107 mm. It will be appreciated that these dimensions may vary somewhat depending upon the type of leash, post, or another object to which the device 100 may be attached.

Figure 3:
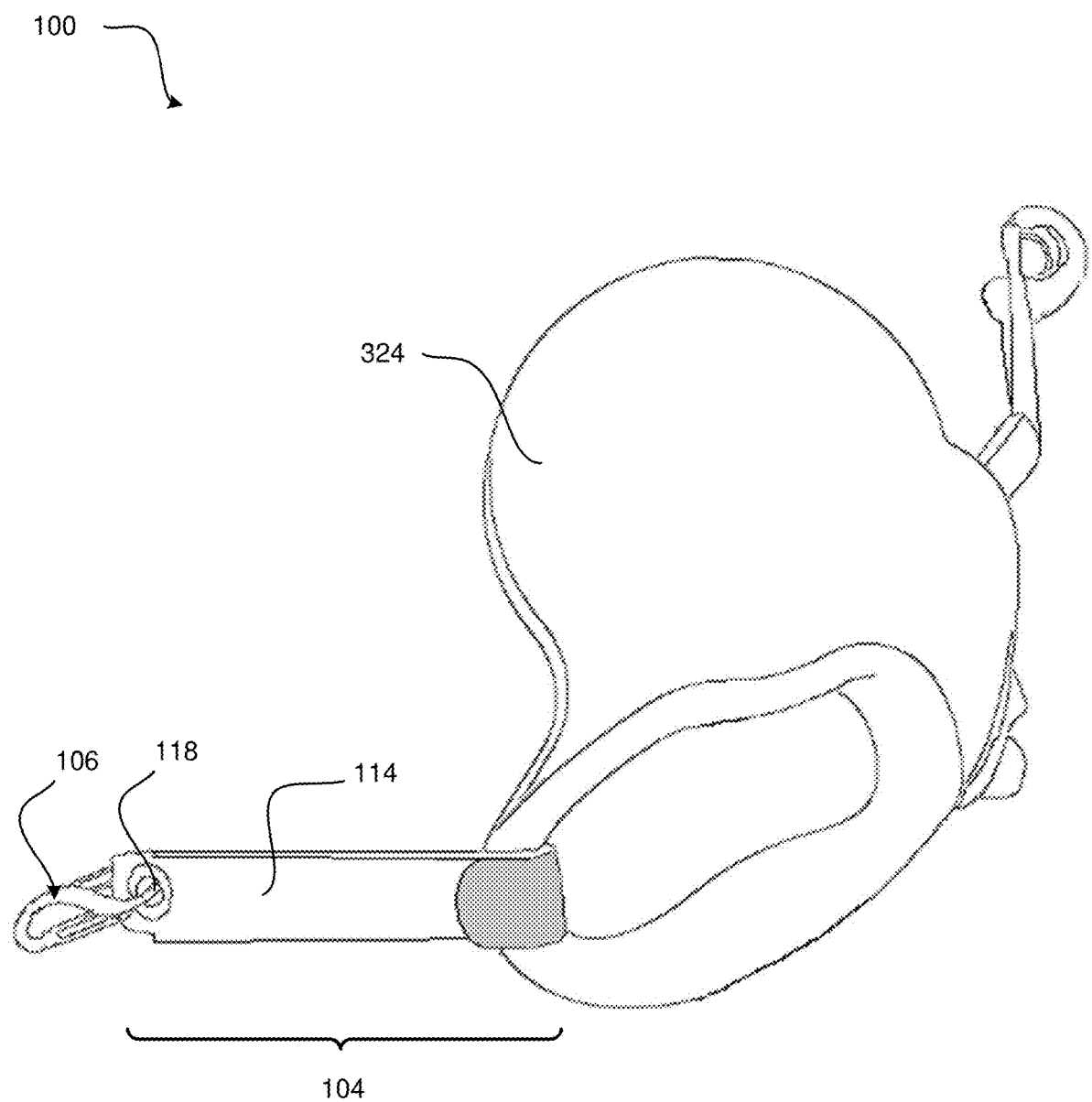
FIG. 3 is a front view of an exemplary device for securing a leash to an object attached to an extendable leash.

FIG. 3 illustrates a side view of the device attached to a retractable leash 324. The first releasably attachable end 120 is joined to the second releasably attachable end 122 via hook and loop material such that the flexible material 114 forms a closed loop 116 around a handle of the retractable leash 324. It should be appreciated that it would then be easy to wrap a leash cord around an object and clip the leash cord to the connector portion 102. This creates an easy way to attach a pet leash to an object without having to remove the leash from the pet, tie the leash into a knot, or thread the leash through a hole.

Figure 4:
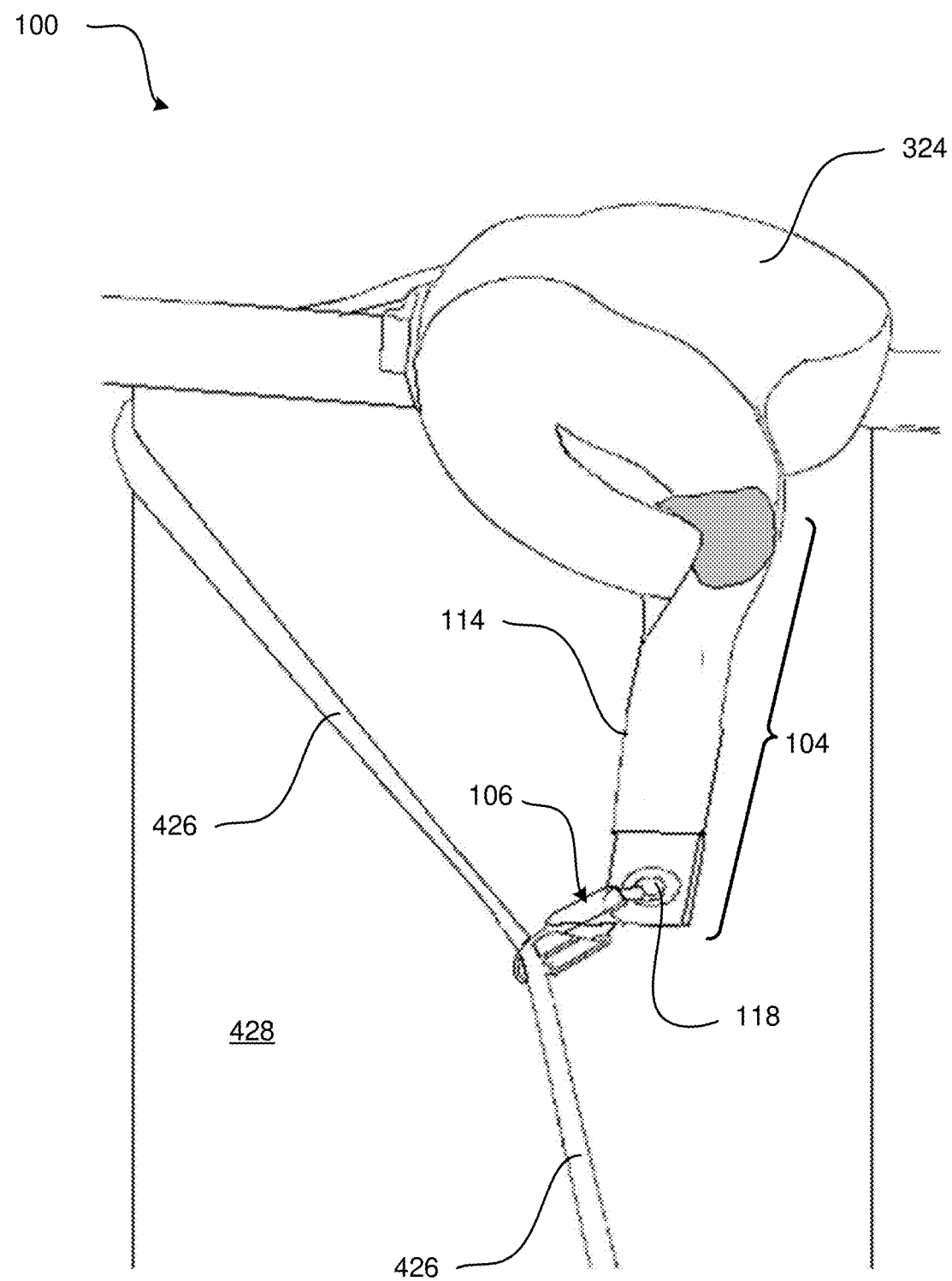
FIG. 4 is a front view of an exemplary device for securing a leash to an object in use (e.g., the device attaches an extendable leash to a rail of a fence or other object)

FIG. 4 is a perspective view of the device 100 being used to releasably secure a leash cord 426 around an object 428. The loop portion 104 of the device 100 is releasably attached to a handle of retractable leash 324. The device 100 and retractable leash 324 are then wrapped around an object 428, such as a rail or other part of the object (e.g., fence), with the connector portion 102 clipped onto leash cord 426. Similar to FIG. 3, the flexible material 114 forms a closed loop 116 with the joining of first releasably attachable end 120 and second releasably attachable end 122.

It will be appreciated that the attachment devices disclosed herein have universal implementation with respect to their ability to attach to and be removed from various leashes. The device disclosed comprises a universal component that may be attached to and removed from one leash to then attached to and removed from another leash. For example, the attachment devices disclosed may be attached to and removed from a retractable leash and then has the ability to attach to a second, standard web leash or rope leash.

The device 100 allows for great flexibility in attaching a leash to another object. Use of the device 100 may be as follows. First, the flexible material 114 may be wrapped around a loop of a leash, the handle of a retractable leash or a standard leash, or wrapped around a post, a tree, or another object. Second, first releasably attachable end 120 is attached to second releasably attachable end 122 to create a closed loop 116. Third, the leash is attached to the connector portion 102 attaching the leash to an object.

The device 100 thus facilitates the connection of the leash cord 426 to an object. Using the device 100 for releasably securing a leash cord 426 to an object means that it is not necessary to tie the leash cord 426 to an object or thread the leash cord 426 through anything. In particular, it is not necessary to disconnect the leash cord 426 from the pet. Furthermore, because the flexible material is small and compact, it could easily stay affixed to the retractable or standard leash until use of the device is required, or it could be stored in a pocket, or even on the collar of the pet, while walking the pet.

It will be appreciated that a typical leash is about six feet long, but the length of the leash may be any length a user desires to permit a pet to move freely while attached to the leash. When using a leash, for example a typical six-foot leash, to wrap around an object it will appreciated that each object has a varying circumference. While using a typical six-foot leash the object's circumference can range from a minimum circumference of about one inch to a maximum circumference that is less than or equal to about five-and-a-half feet, such that the leash is able to wrap around and be attached to the object while still providing some slack in the leash to allow movement for the pet. This concept is referred to as an "infinity length." Thus, the "infinity length" is the circumference of the object to which the leash may be attached and is proportional to the length of the leash, where the leash length is longer than the circumference of the object to which the leash is attached. For example, an "infinity length" for a leash that is six feet long ranges from about one-inch up to about five-and-a-half feet.

Figure 5:
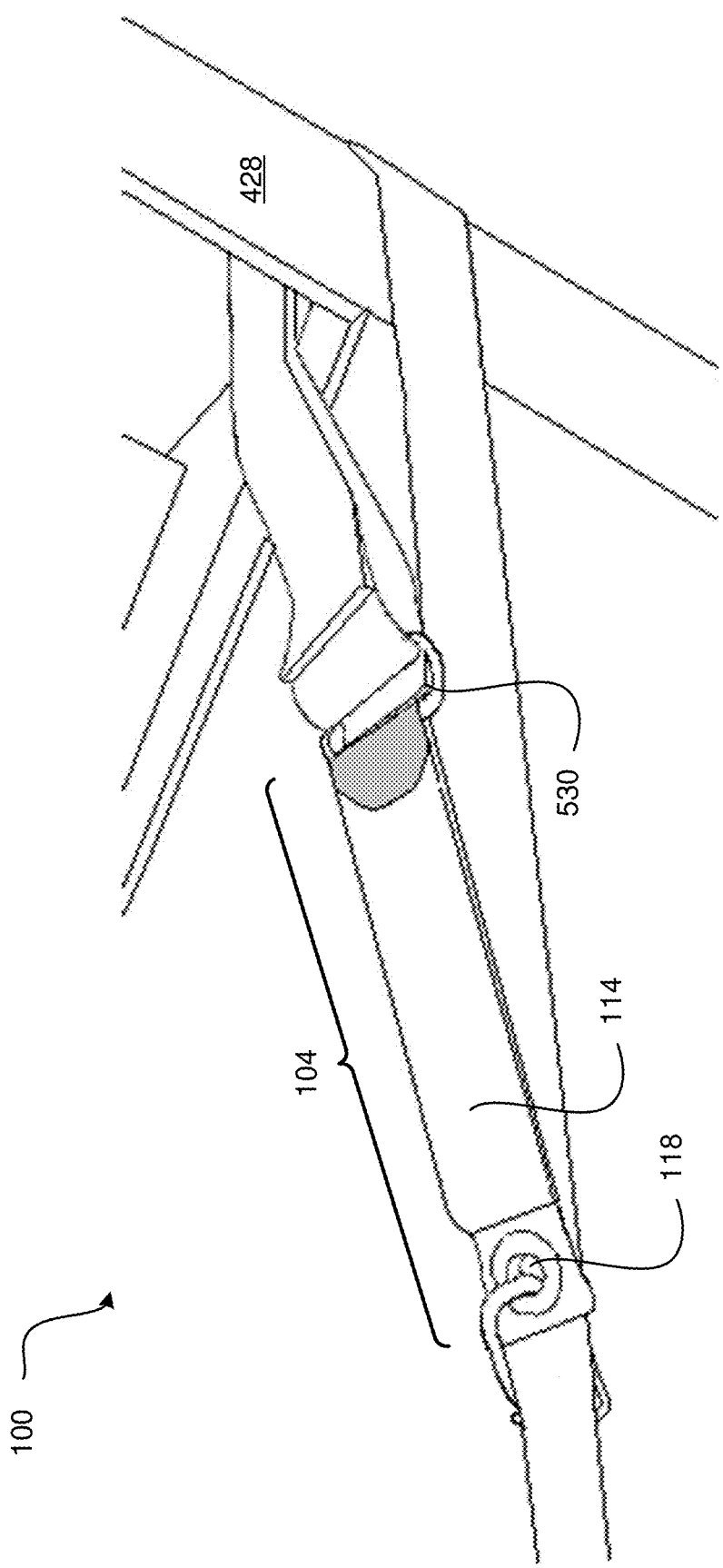
FIG. 5 is a front view of an exemplary device for securing a leash to an object that is attached to an optional buckle and strap, which are then attached to a post or other object.

FIG. 5 illustrates an embodiment in which device 100 is attached to a buckle 530 on a strap or on a standard leash, which is wrapped around an object 428, such as a table leg or railing, and then attached to the connector portion 102. Similar to FIGS. 3 and 4, the flexible material 114 of the loop portion 104 forms a closed loop with the joining of the first releasably attachable end 120 and the second releasably attachable end 122. In addition to attaching to a standard leash or a retractable leash, the device 100 could also be attached to any strap or belt to facilitate the attachment of the strap or belt to an object.

It should be appreciated that the flexibility of the device 100 extends beyond use in pet leashes. The device 100 could be used in any application where a strap, belt, or cord needs to be attached to an object. The device 100 could be used to hang a decoration from a ceiling rafter, attach a strap to a trailer, or any other situation in which a connection device is needed.

Figure 6:
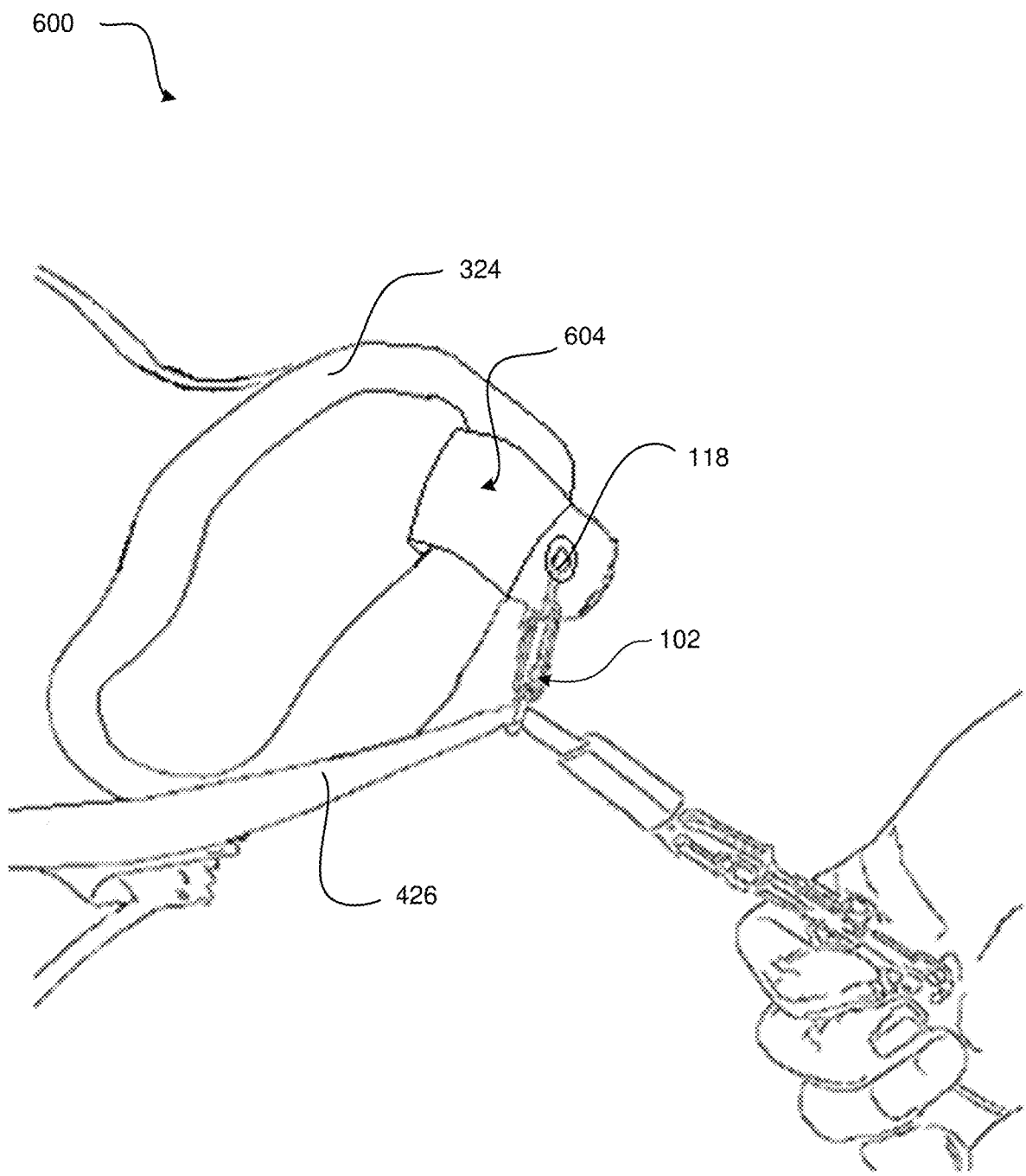
FIG. 6 is a front view of an exemplary device for securing a leash to an object, wherein the device is attached to the handle of an extendable leash and to a leash cord to thereby secure the leash and leash cord around an object.
Figure 7:
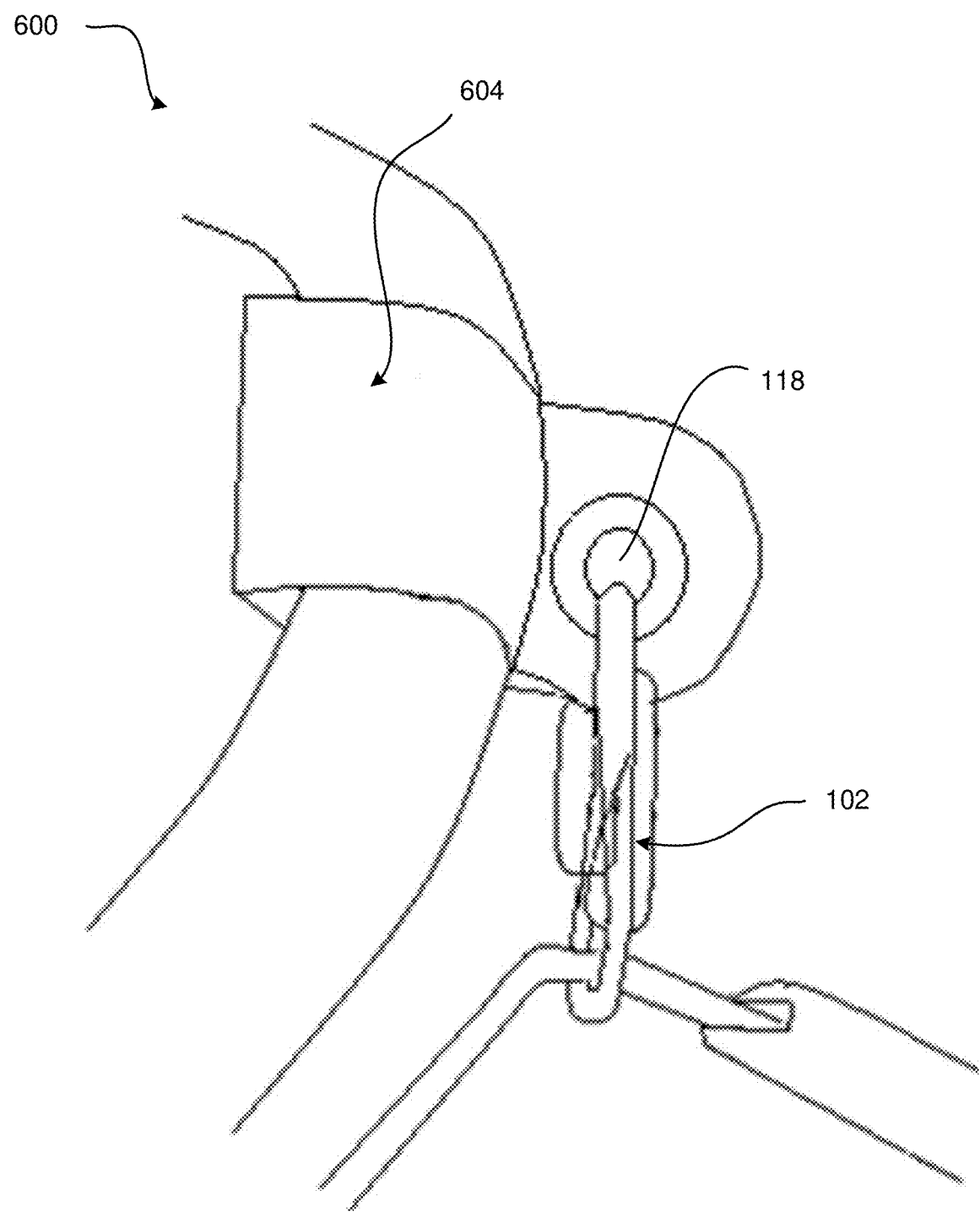
FIG. 7 is a close-up view of FIG. 6.

FIGS. 6 and 7 illustrate perspective views of a device 600 for releasably securing a line to an object. The device 600 illustrated in FIG. 6 is similar to the device 100 discussed in connection with FIGS. 1-5, with the exception that the loop portion 604 is permanently affixed to an object, rather than releasably affixed like the loop portion 104 described in connection with FIGS. 1-5.

The device 600 includes the loop portion 604 wrapped around and attached to the handle of a retractable leash 324. The connector portion 102 is coupled to each of the loop portion 104 and a leash cord 426. In the embodiment illustrated in FIG. 6, the loop portion 604 is permanently affixed to the handle of the retractable leash 324.

It should be appreciated that the device 600 is small enough and simple enough that it never needs to be removed from the handle of the retractable leash 324. In this embodiment, the device 600 may be permanently attached (e.g., sewn) onto the handle of the retractable leash 324, thus making it available any time there is a need to attach the retractable leash 324 to another object. This is a small and simple device that will greatly increase the utility of leashes for pet owners and make it much easier and more convenient to attach leashes to other objects.

Figure 8:
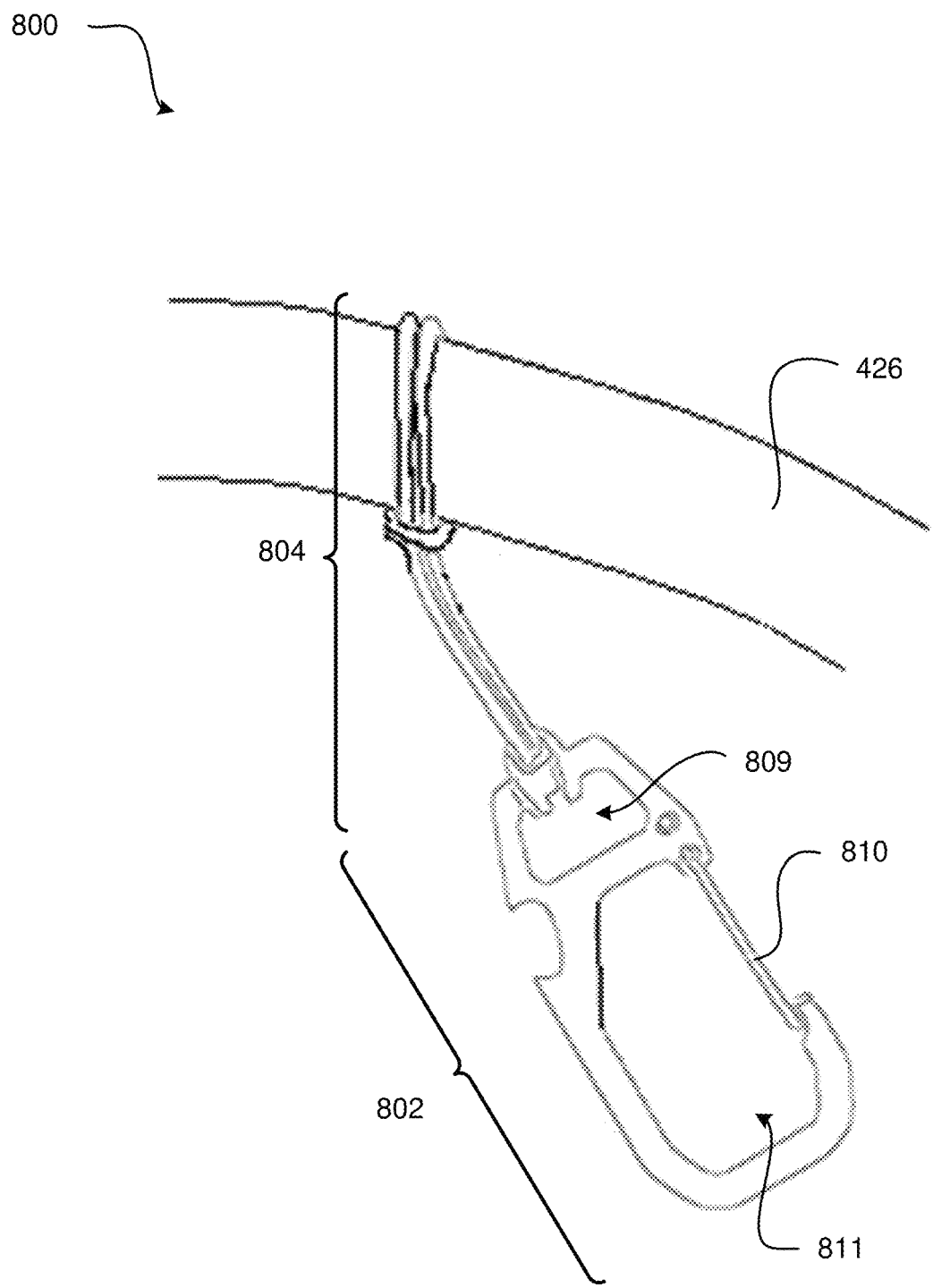
FIG. 8 is a front view of another exemplary device for securing a leash to an object, wherein the device is attached to a leash and to a bar.

FIG. 8 illustrates a device 800 for releasably securing a leash cord 426 to an object. The device 800 illustrated in FIG. 8 is like the devices 100, 600 discussed herein, with the exception that the connector portion 802 comprises a single gate 810 rather than two gates. The connector portion 802 defines a first ring formation 809 and a second ring formation 811, but only the second ring formation 811 can be opened by way of a gate 810. In the implementation illustrated in FIG. 8, the first ring formation 809 is releasably attached to the loop portion 804 because the loop portion is looped through the permanently affixed first ring formation 809 as shown. In the implementation illustrated in FIG. 8, the loop portion 804 includes a cord in a loop formation, such that the cord may be looped around the permanently affixed first ring formation 809 and may further be releasably attached to the leash cord 426 as shown.

FIG. 9 is a schematic flow chart diagram of a method 900 for using a device to secure a leash to an object. The method 900 includes at 902 forming a closed loop around a handle of a retractable leash, or around a loop of a leash, by joining the first and second releasably attachable ends of the device to form a loop. The method 900 continues at 904 and the leash cord is wrapped around an object. The method 900 continues at 906 and the leash cord is attached to the device by hooking it into a connector, such as a carabiner or other connecting device, attached to the device.

FIG. 10 is a schematic flow chart diagram of a method 1000 for using a device for securing a leash to an object. The method 1000 includes at 1002 attaching a loop of flexible material around the loop or handle of a leash and permanently joining the ends of the flexible material such that there is a tab or length of flexible material extending from the joined loop. The method 1000 continues at 1004 and a hole is formed into the tab and a connector, such as a carabiner or other connecting device, is attached to the hole in the tab. The method 1000 continues at 1006 and a leash cord is wrapped around an object and then clipped into the connector, thus attaching the leash to the object.

FIG. 11 is a schematic flow chart diagram of a method 1100 for using a device to secure a leash to an object. The method 1100 includes at 1102 attaching a looped flexible material to an object. The method 1100 continues at 1104 and the looped flexible material is attached to a connector, such as a carabiner or other connecting device. The method 1100 continues at 1106 and a leash cord is attached to the connector, thus attaching the leash to another object.

FIG. 12 is a schematic flow chart diagram of a method 1200 for releasably securing a leash to a post. The method 1200 includes releasably coupling at 1202 a loop 116 to a first ring formation of a double gate connector 106. The loop 116 is constructed of a flexible material 114, and the flexible material 114 includes a hole 118 disposed therethrough. The hole 118 disposed through the flexible material is sized for receiving a first gate 108 and/or a frame 112 of the double gate connector 106. The method 1200 continues with looping at 1204 a leash cord 426 around a post. The method 1200 continues with releasably hooking at 1206 a second ring formation 111 of the double gate connector around the leash cord 426 to releasably secure the leash cord 426 to the post. The second ring formation 111 of the double gate connector 106 is releasably hooked at 1206 by opening a second gate 110 of the double gate connector 106.

EXAMPLES

The following examples pertain to further embodiments.

Example 1 is a device for securing a leash to an object.

Example 2 is a device as in Example 1, wherein the device comprises a flexible material and at least one connector comprising a double gate, wherein the at least one connector is attached to the flexible material.

Example 3 is a device as in any of Examples 1-2, wherein the device comprises a releasably joined loop of flexible material that includes a grommet, a first releasably attachable end, and a second releasably attachable end.

Example 4 is an apparatus as in any of Examples 1-3, wherein the flexible material further comprises at least one material selected from the group consisting of: rubber, silicone, and elastic.

Example 5 is an apparatus as in any of Examples 1-4, wherein the flexible material further comprises at least one zip tie.

Example 6 is an apparatus as in any of Examples 1-5, wherein the flexible material further comprises at least one of the group consisting of: paracord, string, and rope.

Example 7 is an apparatus as in any of Examples 1-6, wherein the first releasably attachable end and the second releasably attachable end are joined with an apparatus selected from the group consisting of: one or more hooks, one or more snaps, one or more buttons, one or more zippers, one or more buckles, one or more click buckles, one or more pins, and one or more clasps.

Example 8 is an apparatus as in any of Examples 1-7, wherein the flexible material further comprises a chain.

Example 9 is an apparatus as in any of Examples 1-8, wherein the flexible material further comprises webbing.

Example 10 is an apparatus as in any of Examples 1-9, wherein the flexible material further comprises tape.

Example 11 is an apparatus as in any of Examples 1-10, wherein the flexible material further comprises a wire or braided cable.

Example 12 is an apparatus as in any of Examples 1-11, wherein the at least one connector of the device is attached to the grommet.

Example 13 is an apparatus as in any of Examples 1-12, wherein the at least one connector of the device comprises at least one carabiner.

Example 14 is an apparatus as in any of Examples 1-13, wherein the at least one connector of the device comprises at least one click buckle.

Example 15 is an apparatus as in any of Examples 1-14, wherein the flexible material is between 10 and 30 mm wide, and the overall length of the flexible material from the grommet to the first releasably attachable end is between 100 mm and 150 mm.

Example 16 is an apparatus as in any of Examples 1-15, wherein the flexible material is about 20 mm wide.

Example 17 is an apparatus as in any of Examples 1-16, wherein the first releasably attachable end and the second releasably attachable end are joined with a hook and loop material.

Example 18 is an apparatus as in any of Examples 1-17, wherein the first releasably attachable end is covered with about 20 mm of hook and loop material.

Example 19 is an apparatus as in any of Examples 1-18, wherein the second releasably attachable end is covered with about 120 mm of hook and loop material.

Example 20 is an apparatus as in any of Examples 1-20, wherein the flexible material further comprises a reflective material.

Example 21 is a device for securing a leash to an object: wherein the device comprises a flexible material having two ends permanently joined together such that the flexible material creates a loop around a leash handle, the flexible material loop further comprising a flattened out tab portion, wherein the tab portion further comprises a hole; wherein the device further comprises at least one connector comprising a double gate, wherein the at least one connector is attached to the flexible material.

Example 22 is an apparatus as in as in Example 21, wherein the flexible material further comprises at least one material selected from the group consisting of: rubber, silicone, and elastic.

Example 23 is an apparatus as in any of Examples 21-22, wherein the flexible material further comprises at least one zip tie.

Example 24 is an apparatus as in any of Examples 21-23, wherein the flexible material further comprises at least one of the group consisting of: paracord, string, and rope.

Example 25 is an apparatus as in any of Examples 21-24, wherein the flexible material further comprises a chain.

Example 26 is an apparatus as in any of Examples 21-25, wherein the flexible material further comprises webbing.

Example 27 is an apparatus as in any of Examples 21-26, wherein the flexible material further comprises tape.

Example 28 is an apparatus as in any of Examples 21-27, wherein the flexible material further comprises a wire.

Example 29 is an apparatus as in any of Examples 21-28, wherein the device further comprises a grommet in the hole in the tab portion of the device.

Example 30 is an apparatus as in any of Examples 21-29, wherein the grommet is a quarter inch (6.35 mm) grommet.

Example 31 is an apparatus as in any of Examples 21-30, wherein the at least one connector is attached to the grommet.

Example 32 is an apparatus as in any of Examples 21-31, wherein the device further comprises at least one connector attached to the grommet, wherein the connector is one or more carabiners.

Example 33 is an apparatus as in any of Examples 21-32, wherein the device further comprises at least one connector attached to the grommet, wherein the connector is at least one click buckle.

Example 34 is an apparatus as in any of Examples 21-33, wherein the flexible material is between 10 and 50 mm wide.

Example 35 is an apparatus as in any of Examples 21-34, wherein the flexible material further comprises a reflective material.

Example 36 is a system for securing a pet on a leash to an object. The system includes a device that comprises a releasably joined loop of flexible material that includes a grommet, a first releasably attachable end, and a second releasably attachable end. The device includes any of the features described in connection with the apparatus of Examples 1-20.

Example 37 is a method of securing a pet on a leash to an object. The method includes forming a loop around a handle of a retractable leash or around a loop of a leash by joining the first and second releasably attachable ends of the device. The method continues and a leash cord is wrapped around an object. The method continues and the leash cord is attached to the device by hooking it into a connector attached to the device. The method includes any of the features described in connection with the device of Examples 1-20.

Example 38 is a method of securing a pet on a leash to an object. The method includes attaching a loop of flexible material around the loop or handle of a leash and permanently joining the ends of the flexible material such that there is a tab or length of flexible material extending from the joined loop. The method continues and a hole is formed into the tab and a connector is attached to the hole in the tab. The method continues and a leash cord is wrapped around an object and then clipped into the connector, thus attaching the leash to the object. The method includes any of the features described in connection with the device of Examples 21-35.

Example 39 is a method of securing a pet on a leash to an object. The method includes attaching a looped flexible material to an object. The method continues and the looped flexible material is attached to a connector. The method continues and a leash cord is attached to the connector, thus attaching the leash to another object. The method includes any of the features described in connection with the device of Examples 1-20.

Example 40 is a device, system, or method as in any of Examples 1-39, wherein the attachment device is a universal component that may be attached to and removed from one leash to then attached to and removed from another leash.

Example 41 is a device. The device includes a loop constructed of a flexible material, wherein the flexible material comprises a hole disposed therethrough. The device includes a connector comprising a frame defining a first ring formation and a second ring formation, wherein the first ring formation is opened by way of a first gate, and wherein the second ring formation is opened by way of a second gate. The device is such that a portion of the frame defining the first ring formation is disposed through the hole of the loop such that the connector is releasably coupled to the loop. The device is such that the second ring formation of the connector is configured to receive a line.

Example 42 is a device as in Example 41, wherein the connector is a double gate connector and further comprises a swivel disposed between the first gate and the second gate, wherein the swivel enables the first gate to rotate relative to the second gate.

Example 43 is a device as in any of Examples 41-42, wherein the hole disposed through the flexible material further comprises a grommet, and wherein an interior diameter defined by the grommet is optimized to receive the frame of the connector and the first gate.

Example 44 is a device as in any of Examples 41-43, wherein the line comprises a leash cord, and wherein the second gate is configured to open to enable the second ring formation to receive the leash cord; and wherein the second gate is configured to close such that the leash cord is disposed within the second ring formation.

Example 45 is a device as in any of Examples 41-43, wherein the connector comprises a double gate carabiner comprising: a first carabiner comprising the first ring formation and the first gate; and a second carabiner comprising the second ring formation and the second gate.

Example 46 is a device as in any of Examples 41-45, wherein at least one of the first gate or the second gate comprises a spring configured to automatically spring into a closed position when not being depressed, and wherein the closed position is defined by at least one of the first ring formation or the second ring formation forming a closed loop.

Example 47 is a device as in any of Examples 41-46, wherein the loop is formed of a length of the flexible material comprising a first releasably attachable portion and a second releasably attachable portion, and wherein the first releasably attachable portion is attached to the second releasably attachable portion to form the loop.

Example 48 is a device as in any of Examples 41-47, wherein the first releasably attachable portion is joined to the second releasably attachable portion by way of one or more of a hook, snap, button, zipper, buckle, clasp, or hook and eye closure.

Example 49 is a device as in any of Examples 41-48, wherein the length of the flexible material further comprises a tab, and wherein the hole disposed through the flexible material is located at the tab, and wherein the tab is disposed between the first releasably attachable portion and the second releasably attachable portion.

Example 50 is a device as in any of Examples 41-49, wherein at least one of the first gate or the second gate comprises a locking sleeve such that the at least one of the first gate or the second gate can be locked in a closed position, wherein the closed position is defined by at least one of the first ring formation or the second ring formation forming a closed loop.

Example 51 is a system. The system includes a leash cord. The system includes a loop constructed of a flexible material, wherein the flexible material comprises a hole disposed therethrough. The system includes a connector comprising a frame defining a first ring formation and a second ring formation, wherein the first ring formation is opened by way of a first gate, and wherein the second ring formation is opened by way of a second gate. The system is such that at least a portion of the frame defining the first ring formation is disposed through the hole of the loop such that the connector is releasably coupled to the loop. The system is such that the second ring formation of the connector is configured to receive the leash cord to releasably secure the leash cord around an object.

Example 52 is a system as in Example 51, wherein the connector is a double gate connector and further comprises a swivel disposed between the first gate and the second gate, wherein the swivel enables the first gate to rotate relative to the second gate.

Example 53 is a system as in any of Examples 51-52, wherein the hole disposed through the flexible material further comprises a grommet, and wherein an interior diameter defined by the grommet is optimized to receive the frame of the connector and the first gate.

Example 54 is a system as in any of Examples 51-53, wherein the second gate is configured to open to enable the second ring formation to receive the leash cord; and wherein the second gate is configured to close such that the leash cord is disposed within the second ring formation.

Example 55 is a system as in any of Examples 51-54, wherein the connector comprises a double gate carabiner comprising: a first carabiner comprising the first ring formation and the first gate; and a second carabiner comprising the second ring formation and the second gate.

Example 56 is a system as in any of Examples 51-55, wherein at least one of the first gate or the second gate comprises a spring configured to automatically spring into a closed position when not being depressed, and wherein the closed position is defined by at least one of the first ring formation or the second ring formation forming a closed loop.

Example 57 is a system as in any of Examples 51-56, wherein the loop is formed of a length of the flexible material comprising a first releasably attachable portion and a second releasably attachable portion, and wherein the first releasably attachable portion is attached to the second releasably attachable portion to form the loop.

Example 58 is a system as in any of Examples 51-57, wherein the first releasably attachable portion is joined to the second releasably attachable portion by way of one or more of a hook, snap, button, zipper, buckle, clasp, or hook and eye closure.

Example 59 is a system as in any of Examples 51-58, wherein the length of the flexible material further comprises a tab, and wherein the hole disposed through the flexible material is located at the tab, and wherein the tab is disposed between the first releasably attachable portion and the second releasably attachable portion.

Example 60 is a method of releasably securing a leash cord to an object. The method includes releasably coupling a loop to a first ring formation defined by a frame of a double gate connector, wherein the loop is constructed of a flexible material, and wherein the flexible material comprises a hole disposed therethrough for receiving the frame of the double gate connector. The method includes looping the leash cord around the object. The method includes releasably hooking a second ring formation defined by the frame of the double gate connector around the leash cord to releasably secure the leash cord to the post.

Reference throughout this specification to "an example" means that a particular feature, structure, or characteristic described in connection with the example is included in at least one embodiment of the disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the disclosure may be referred to herein along with alternatives for the various components thereof. It is understood that such embodiments, examples, and alternatives are not to be construed as de facto equivalents of one another but are to be considered as separate and autonomous representations of the disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A system comprising:
   a leash cord;
   a loop constructed of a flexible material, wherein the flexible material comprises a hole disposed therethrough;
   a connector comprising a frame defining a first ring formation and a second ring formation, and wherein one or more of the first ring formation and the second ring formation is opened by way of a gate;
   wherein a portion of the frame defining the first ring formation is disposed through the hole of the loop such that the connector is releasably coupled to the loop; and
   wherein the second ring formation of the connector is configured to receive the leash cord to releasably secure the leash cord around an object;
   wherein the loop is formed of a length of the flexible material comprising a first releasably attachable portion and a second releasably attachable portion, and wherein the first releasably attachable portion is attached to the second releasably attachable portion to form the loop.

2. The system of claim 1, wherein the gate of the connector is a double gate connector comprising a first gate and a second gate, wherein the connector further comprises a swivel disposed between the first gate and the second gate, wherein the swivel enables the first gate to rotate relative to the second gate.

3. The system of claim 1, wherein the hole disposed through the flexible material further comprises a grommet, and wherein an interior diameter defined by the grommet is optimized to receive the frame of the connector and the gate.

4. The system of claim 1, wherein the second gate is configured to open to enable the second ring formation to receive the leash cord; and
   wherein the second gate is configured to close such that the leash cord is disposed within the second ring formation.

5. The system of claim 1, wherein the connector comprises a double gate carabiner comprising:
- a first carabiner comprising the first ring formation and a first gate; and
- a second carabiner comprising the second ring formation and a second gate.

6. The system of claim 1, wherein the gate comprises a spring configured to automatically spring into a closed position when not being depressed, and wherein the closed position is defined by at least one of the first ring formation or the second ring formation forming a closed loop.

7. The system of claim 1, wherein the first releasably attachable portion is joined to the second releasably attachable portion by way of one or more of a hook, snap, button, zipper, buckle, clasp, or hook and eye closure.

8. The system of claim 1, wherein the length of the flexible material further comprises a tab, and wherein the hole disposed through the flexible material is located at the tab, and wherein the tab is disposed between the first releasably attachable portion and the second releasably attachable portion.

9. The system of claim 1, wherein the gate of the connector is a double gate connector comprising a first gate and a second gate, wherein at least one of the first gate or the second gate comprises a locking sleeve such that the at least one of the first gate or the second gate can be locked in a closed position, and wherein the closed position is defined by at least one of the first ring formation or the second ring formation forming a closed loop.

10. A method of releasably securing a leash cord to an object, the method comprising:
- releasably coupling a loop to a connector, wherein the connector comprises a frame defining a first ring formation and a second ring formation, wherein the loop is constructed of a flexible material, and wherein the flexible material comprises a hole disposed therethrough for receiving the frame of the connector, such that a portion of the frame defining the first ring formation is disposed through the hole of the loop such that the connector is releasably coupled to the loop;
- wherein one or more of the first ring formation and the second ring formation is opened by way of a gate;
- wherein the loop is formed of a length of the flexible material comprising a first releasably attachable portion and a second releasably attachable portion, and wherein the first releasably attachable portion is attached to the second releasably attachable portion to form the loop;
- looping the leash cord around the object; and
- releasably hooking the second ring formation around the leash cord to releasably secure the leash cord to the object.

* * * * *